Dec. 3, 1929.  J. L. D. KEPPY  1,737,928
HEATING DEVICE
Filed Aug. 27, 1928  2 Sheets-Sheet 1
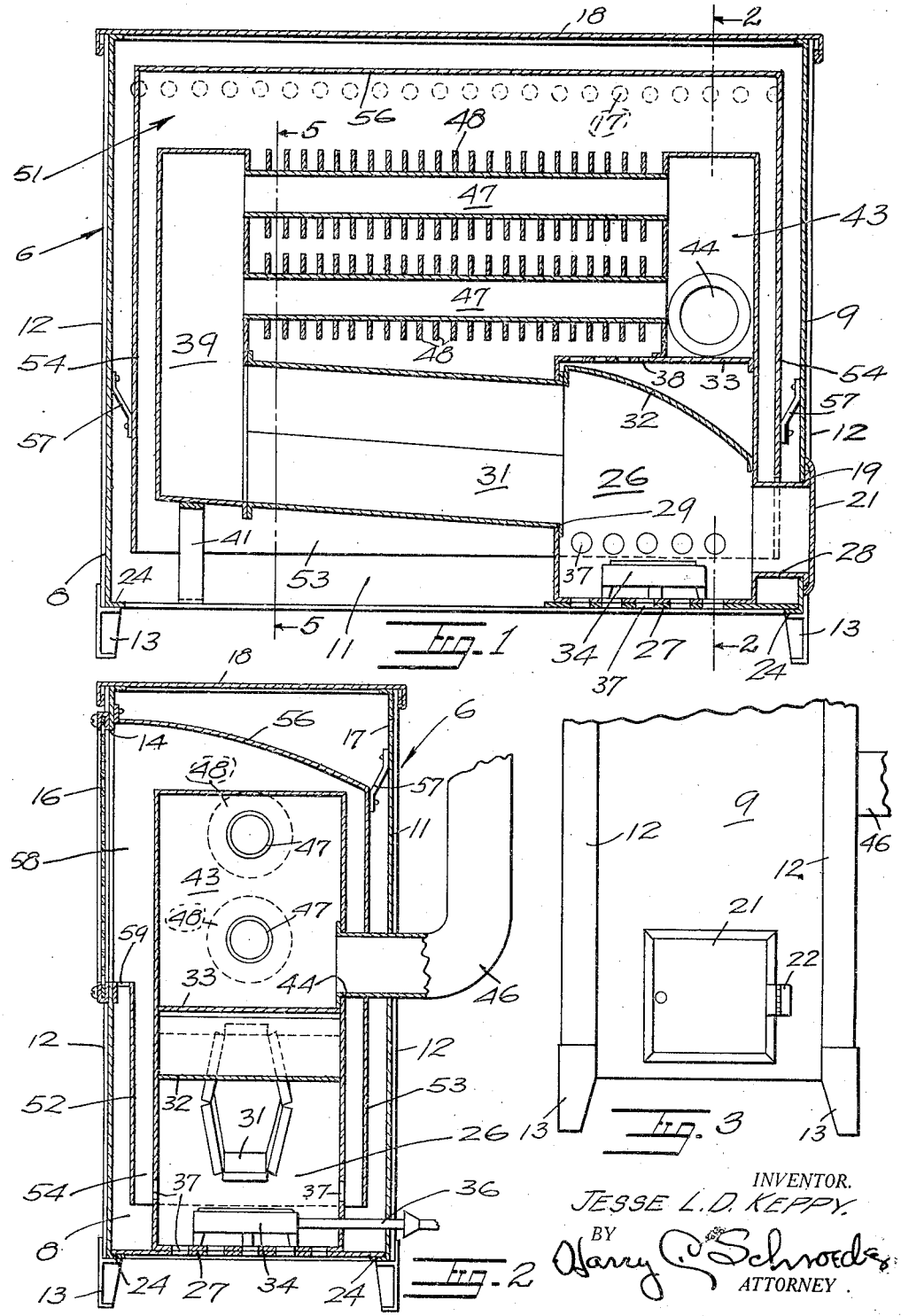
INVENTOR.
JESSE L. D. KEPPY.
BY
Harry C. Schroeder
ATTORNEY.

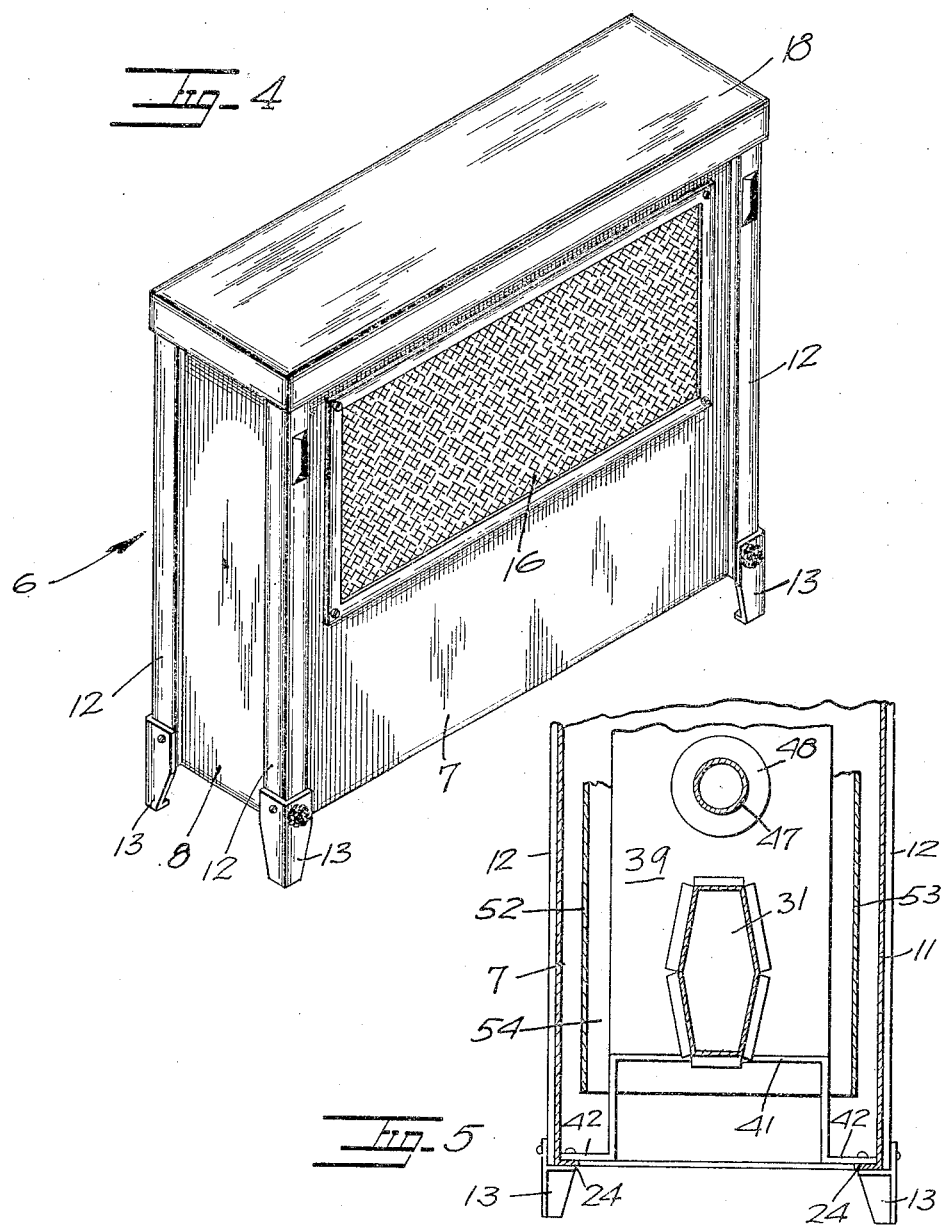

Patented Dec. 3, 1929

1,737,928

UNITED STATES PATENT OFFICE

JESSE L. D. KEPPY, OF BERKELEY, CALIFORNIA

HEATING DEVICE

Application filed August 27, 1928. Serial No. 302,183.

The invention forming the subject matter of this application relates to heaters and particularly to heaters in which the air is circulated.

The primary object of the invention is the provision of a heater by which the cold air is taken out of the room, passed over a heated surface, and is returned unimpaired to heat the room, thus setting up a circulation of pure air in the room heated and thus quickly bringing the room to an even comfortable temperature.

Another object of the invention is the provision of a heater in which the air is so circulated that the air of the room is in no way devitalized and in no way comes in contact with the fire generating the heat; thereby obviating the discharge of moisture into the room and any deterioration of the contents and the walls of the room by sudden changes of temperature.

Another object of the invention is the provision of a heater in which the heating of the room is accomplished by circulating the air in the heater around the heater surface, thereby evenly heating the whole room. The use of my heater obviates the possibility of rendering a certain part of the room too hot long before the rest of the room becomes warm.

Another object of the invention is the provision of a heater which uses a gas fuel or other internal combustion heating element in which the gases of combustion are circulated in a tortuous passage of heating elements providing a large radiating surface, said gases of combustion being discharged from the heater outside of the room to be heated, and the heating elements being surrounded by a casing for directing the heat so as to receive the cold air at the bottom and discharge the rising warm air thru an outlet opening on the side or on the top. The heating elements are so arranged that the warm air rising in the inside casing is forced to circulate around said heating element before it rises to the outlet opening of the casing. Furthermore, an inner casing is provided, spaced from the outer casing, so as to form an insulating jacket outside and around the inner casing, thereby preventing the outside casing of the heater from becoming too hot.

Other objects of the invention are the provision of a heater of the character described, that will draw the cold air from the room and replace it with warm air which circulates the heat to the entire room and not to a particular part of the room, that will give a very uniform heat and air that is pure and free from gases of combustion, and that will be superior in point of simplicity, inexpensiveness of construction, positiveness of operation, facility and convenience in use, and general efficiency.

In this specification and the annexed drawings, the invention is illustrated in the form considered to be the best, but it is to be understood that the invention is not limited to such form because it may be embodied in other forms, and it is also to be understood that in and by the claims following the description, it is desired to cover the invention in whatsoever form it may be embodied.

In the drawings, Figure 1 is a sectional view of the heater;

Figure 2 is a sectional side view of the heater, the section being taken along the line 2—2 of Figure 1;

Figure 3 is an end view of the heater looking at the end adjacent to the fire box of the heater;

Figure 4 is a perspective view of the heater; and

Figure 5 is a sectional side view of the heater and the combustion chamber and radiating elements therein, the section being taken on the line 5—5 of Figure 1.

Referring to the accompanying drawings, wherein similar reference characters designate similar parts thruout, the various figures described above adequately illustrate my invention, and the following detailed description is commensurate with the above mentioned drawings in enabling an artisan to construct and assemble the constituent parts of the same.

In carrying out my invention, I make use of an outer casing, denoted in its entirety by the numeral 6, and comprising a front wall 7, side walls 8 and 9, and a rear wall 11. The casing is substantially rectangular, and the corners thereof are so bent as to form protruding corners 12, at the lower end of which are secured legs 13. The four legs 13 support the casing on the floor and at the same time space the bottom of the casing from the floor. The front wall 7 of the casing 6 has an opening 14 therein, which serves as the warm air outlet opening of the heater. The outlet opening 14 is covered by a metal lace grille or screen 16. On the rear face 11, adjacent to the top edge of the casing 6, are apertures 17 which serve as cold air inlet openings. The bottom of the casing 6 is uncovered so as to permit the entrance of the cold air therethru. The top of the casing 6 is covered by a lid 18, the downwardly depending flanges of which overlap the side walls of the casing 6. The lid 18 is removable from the casing. An opening 19 is covered by a door 21, which is secured upon a hinge 22 on the side wall 9. The opening 19 communicates with the heating elements of the heater, to be hereinafter described. The bottom edges of the casing 6 are bent inwardly so as to form flanges 24 for supporting the heating elements of the heater.

A fire box 26 is disposed adjacent to and spaced from the wall 9 of the casing 6, and rests upon a plate 27 extending across the whole width of the bottom of the casing 6 so that said plate 27 rests, in turn, upon the three adjacent flanges 24 of the casing 6. The width of the plate 27 is not any larger than it is necessary to support the fire box 26. A conduit 28 extends from the fire box 26, connecting the same to the opening 19, as clearly shown in Figure 1. It is apparent that the fire box is readily accessible thru the opening 19 upon the opening of the door 21.

The fire box 26 is of such a size as to be spaced from the three adjacent side walls 7, 9, and 11 of the casing 6. On the wall of the fire box 26, opposite to the conduit 28, an outlet opening 29 is provided, into which is secured a combustion chamber 31. The opposite ends of the combustion chamber are flanged, and one flanged end thereof is secured to the wall of the fire box 26 inside of the opening 29 thereof. A baffle plate 32 is disposed in the fire box below a top 33 thereof so as to direct the gas and the products of combustion from the fire box 26 into the combustion chamber 31. In the fire box 26 is placed a suitable burner 34 to which fuel is conducted thru a feed pipe 36 extending thru the walls of the fire box and the casing. Air for the combustion of gas passes into the fire box 26 thru apertures 37 in the bottom and on the opposite sides of the fire box. In order to obviate the overheating of the air in the pocket formed between the baffle plate 32 and the top 33 of the fire box, the top 33 has openings 38 therein thru which the air circulates into and out of the pocket below the top 33.

At the end of the combustion chamber 31 is positioned an inlet chamber 39 secured to the end of the combustion chamber 31 and resting upon a bracket 41. Said bracket is substantially U-shaped, the legs of the U-shaped member being bent outwardly so as to form flanges 42 thereat, which, in turn, are secured on the inwardly extending flanges 24 of the casing 6, as clearly shown in Figure 5. The combustion chamber 31 is constructed in a hexagonal shape so as to provide a larger heating surface for the air passing around the same. The inlet chamber 39 is made of such size as to leave a clearance between the adjacent three walls of the casing 6, permitting the circulation of the air around the outside surface thereof.

On the top plate 33 of the fire box 26 is formed an outlet chamber 43, into a vent outlet 44 of which is secured a vent pipe 46. The inlet chamber 39 and the outlet chamber 43 are connected to each other by means of two tubes 47. In order to further increase the heating surface of the aforedescribed heating element, annular fins 48 are formed all around the outside circumference of each tube 47. The fins 48 are disposed parallel to each other. The aforedescribed heating elements conduct the gases and the products of combustion thru a tortuous passage.

The burning gas from the burner 34 is directed by the baffle plate 32 into the combustion chamber 31. The products of combustion are then conducted in the inlet chamber 39 and thru the tubes 47 into the outlet chamber 43 and then out thru the vent pipe 46. During this tortuous passage of the products of combustion, most of the useful heat thereof is given up to the air passing around the outside surface of said heating elements.

Between the heating elements heretofore described and the outside casing 6 is positioned an inner casing, denoted in its entirety by the numeral 51, and comprising a front wall 52, a rear wall 53, side walls 54, and a curved top 56. The inner casing 51 surrounds the heating elements so as to prevent the direct heating of the outside casing 6, thereby preventing the outside casing from becoming too hot. The bottom of the inner casing 6 is completely opened so as to permit the passage of the cold air thereat to the inside of the inner casing 51. The side walls 54 of the inner casing 51, adjacent to the fire box conduit 28, are so shaped as to surround the fire box conduit, and the side walls 54 are secured to the outside casing 6 by means of brackets 57. In the front wall 52 of the inner casing is a warm air outlet opening 58 disposed in registry with the opening 14 of the front wall 7. Apertures 59 are provided adjacent to the wall 52 of the inner casing just below the opening 14 so as to permit the entry of the cold air thereat which may flow in thru the lower edge of said opening.

In the operation of the heater, the air of the room is heated by circulation around the aforedescribed heating elements inside of the inner casing 51. The heater takes advantage of the natural law of gravitation and of the fact that cold air, being heavier than warm air, falls to the lower part of the room. This cold air is taken out of the room and enters thru the open bottom of the outer casing 6. The cold air then rises and circulates upwardly toward the heating elements and it circulates around said heating elements inside of the inner box 51. The heating elements give up heat to the air passing therearound so that the air thus warmed further rises and is directed by the inner casing 58 toward the warm air outlet openings 14 and is returned, unimpaired, thru the screen 16 into the room to be heated.

Cold air also enters thru the apertures 17 from which it cannot pass directly to the heating elements, but it travels downwardly by its own gravity between the walls of the inner casing 51 and the outer casing 6, thereby providing a continuous heat insulation for obviating the over-heating of the outside casing 6. The cold air moving downwardly reaches the bottom opening of the inner casing 51, whereupon it rises into the inner casing and is circulated around the heating elements in the aforesaid manner.

All the cold air that may flow into the outer casing 6 must travel first around the outer casing unless it is directly introduced thru the bottom so that the side walls and the top of the inner casing 51 are continuously insulated from the outer casing 6 by the circulating cold air. If any cold air may flow in at the lower edge of the openings 14, it will flow down by its own gravity thru the apertures 59 around the front wall 52 of the inner casing 51 until it reaches the bottom opening of said inner casing. Then it rises upwardly in the aforesaid manner.

It will be recognized that an efficient heater is provided in which air is continuously circulated, but in which any admixture of the products of combustion with the air of the room is entirely obviated. Furthermore, the heating elements are so designed as to offer a large heating surface, thereby giving up efficiently the heat of the products of combustion. On account of the long tortuous passage, the gas is completely burned before it leaves the heater, thereby effecting great economy of fuel. The appearance of the heater is that of a piece of furniture so that it may readily harmonize with the interior of any room. There is no danger of scorching or burning from the outside casing, because the same is insulated from the heating elements by the inner casing and by the circulation of cold air between the inner casing and the outer casing. The aforedescribed method of heating sets up a circulation of pure air in the room to be heated, and by this method the room is quickly brought to an even comfortable temperature. The air is caused to circulate thereby, not only in the heater but also in the whole room to be heated, thus heating the whole room evenly and not in one particular point thereof. The heat may be readily regulated by the regulation of the valve for the fuel supply and thus economically producing the desired even temperature in the room.

I claim:

1. A heater comprising an outer casing, a fire box supported in the casing, a tortuous passage for conducting the products of combustion from said fire box, an outlet chamber at the end of the passage and being disposed above said fire box, said fire box being so constructed as to form a cooling pocket between the fire box and the outlet chamber and to allow the circulation of air in said pocket; and an inner casing spacedly disposed between said passage and the outer casing; said inner and outer casings having corresponding inlet and outlet openings thereon; said outer casing having a cold air inlet opening above said inlet openings for creating a flow of cold air between said casings.

2. A heater comprising an outer casing, a fire box supported in the casing, a tortuous passage for conducting the products of combustion from said fire box; heat radiating fins extending from said passage, an outlet chamber at the end of the passage being disposed above said fire box, a cooling pocket formed between the bottom of the outlet chamber and the top of the fire box chamber, said pocket having apertures therein communicating with the air in the casing; and an inner casing spacedly disposed between said passage and the outer casing; said inner and outer casings having corresponding inlet and outlet openings thereon; said outer casing having a cold air inlet opening above said inlet openings for creating a flow of cold air between said casings.

3. A heater comprising an outer casing, a fire box supported in the casing, a combustion chamber extending from the casing, an inlet box at the end of the combustion chamber for receiving the products of combustion, an outlet chamber disposed above the fire box, tubes with heat radiating fins extending from the outside periphery thereof, said tubes connecting said inlet box and outlet chamber; a cooling pocket formed between the bottom of the outlet chamber and the top of the fire chamber of the fire box, said pocket having apertures therein communicating with the air in the casing; and an inner casing spacedly disposed between said passage and the outer casing; said inner and outer casings having corresponding inlet and outlet openings thereon; said outer casing having a cold air inlet opening above said inlet openings for creating a flow of cold air between said casings.

4. A heater comprising an outlet casing, a fire box supported in the casing, a tortuous passage for conducting the products of combustion from said fire box; said passage having heat radiating fins extending therefrom, an outlet chamber at the end of the passage being disposed above said fire box, a cooling pocket formed between the bottom of the outlet chamber and the top of the fire box chamber, said pocket having apertures therein communicating with the air in the casing; said outer casing having lower and upper inlet openings and an outlet opening thereon; and means disposed between the tortuous passage and the outer casing for directing the air from the lower inlet opening to the outlet openings, circulating the same around the outside surface of said passage and chamber, and for directing a flow of cold air from the upper inlet opening around the inside surface of the outer casing for insulating the same from said passage and chamber.

5. A heater comprising an outer casing, a fire box supported in the casing, a combustion chamber extending from the casing, an inlet box at the end of the combustion chamber for receiving the products of combustion, an outlet chamber disposed above the fire box; tubes with heat radiating fins extending from the outside periphery thereof, said tubes connecting said inlet box and outlet chamber; a cooling pocket formed between the bottom of the outlet chamber and the top of the fire chamber of the fire box, said pocket having apertures therein communicating with the air in the casing; said outer casing having lower and upper inlet openings and an outlet opening thereon; and means disposed between the tortuous passage and the outer casing for directing the air from the lower inlet opening to the outlet opening, circulating the same around the outside surface of said passage and chamber, and for directing a flow of cold air from the upper inlet opening around the inside surface of the outer casing, for insulating the same from said passage and chamber.

In testimony whereof I affix my signature.

JESSE L. D. KEPPY.